United States Patent [19]

Höfle

[11] Patent Number: 5,489,173
[45] Date of Patent: Feb. 6, 1996

[54] DEVICE FOR ATTACHMENT TO A FASTENING RAIL

[75] Inventor: Siegfried Höfle, Götzis, Austria

[73] Assignee: Hilti Aktiengesellschaft, Schaan, Liechtenstein

[21] Appl. No.: 169,844

[22] Filed: Dec. 17, 1993

[30]  Foreign Application Priority Data

Dec. 19, 1992 [DE] Germany .......................... 42 43 185.9

[51] Int. Cl.$^6$ ............................. F16B 21/00; F16B 27/00
[52] U.S. Cl. .................. 411/85; 411/104; 411/553
[58] Field of Search ................................ 411/84, 85, 104, 411/112, 551, 553, 432

[56]  References Cited

U.S. PATENT DOCUMENTS 5,067,863  11/1991  Kowalski ..................................... 411/85
5,209,619  5/1993  Rinderer ..................................... 411/85
5,271,586  12/1993  Schmidt ................................. 411/85 X Primary Examiner—Neill R. Wilson
Attorney, Agent, or Firm—Anderson Kill Olick & Oshinsky

[57]  ABSTRACT

An attachment device secures structural component (39) to a fastening rail (32) having a slot-like opening (34). The attachment device includes a flexural member (27) to afford better handling. The flexural member (27) is deflectable in the axial direction as well as in the radial direction. A snap-in connection of the attachment device to the fastening rail (32) is achieved by the outside contour of a radially spring deflectable region (31) of the flexural member (27) which has a dimension greater than the width of the slot-like opening (34). An elastic axially extending region (28) of the flexural member (27) provides an axial prestress between a base member (21) and a cap member (29), so that accidental detachment of the attachment device positioned in the fastening rail (32) is prevented.

8 Claims, 4 Drawing Sheets

DEVICE FOR ATTACHMENT TO A FASTENING RAIL

BACKGROUND OF THE INVENTION

The present invention is directed to an attachment device or channel nut assembly base including a base member or channel nut, a cap member and a flexural member, with the base member made up of a non-circular head, a threaded opening extending through the head and at least one first anti-rotation surface. The cap member has at least one through opening and at least one second anti-rotation surface for engagement with the first anti-rotation surface, so that the two surfaces cannot rotate relative to one another but only rotate as a unit.

An installation system is disclosed in CH-PS 597 450 including an attachment member in the form of an attachment rail comprising a hollow section of rectangular cross-section with at least one recess in a long direction of the rail in the form of a slot-like opening for insertion of one or more attachment devices. The slot-like opening is limited in width by the free ends of a pair of legs.

The attachment rail has locking grooves serving to axially secure the attachment device. The attachment device comprises a base member with a non-circular head, an intermediate member and a clamping member, wherein the attachment member is able to clamp or tighten the base member and the cap member against one another, for securing such an attachment device to an attachment rail located on a ceiling so that its slot-like opening faces downwardly. The base member of the attachment device is placed into the slot-like opening and turned through 90°, whereby the non-circular head rests inside the attachment rail at the inner side of the two legs.

This known device demonstrates that the attachment device can be fixed to the attachment rail merely by turning the base member without the possibility of loosening it. When securing this known attachment device, the base member must be turned at least partially, so that the non-circular head of the base member rests at the inner side of the legs.

Depending on the manner in which it is used, it is necessary to align the attachment device relative to an attachment member by displacing the device with respect to the attachment member shaped as a fastening rail. The known attachment devices can no longer be displaced after they have been finally clamped and tightened against the fastening rail, since a portion of the base member projects into locking grooves on the fastening rail.

SUMMARY OF THE INVENTION

Therefore, the primary object of the present invention is to provide an attachment device so that the attachment device can be inserted into a recess or opening in an attachment member or channel member whereby it is secured against falling out before rotating the base member.

In accordance with the present invention, the attachment member has a non-circular recess whereby the insertion of the head of the base member in a particular angular position can be effected and a flexural member is positioned at the base member affording flexural insertion perpendicularly to the axis of the threaded opening. The flexural member projects with its radially unloaded or unstressed outside contour at least partially beyond partial regions of the projection of the recess.

In using such a flexural member capable of insertion with spring-like deflection, it is possible to fix the attachment device in the recess of a attachment member for temporary retention, without turning or rotating the base body.

Preferably the flexural member is located between the head of the base member and the intermediate cap member. With such an arrangement of the attachment device, it is possible to fix the attachment device at the attachment member without having the non-circular head gripped within the attachment member.

To obtain an axial prestress of the complete attachment device in the fixed position, it is advantageous if the flexural member can flex or deflect parallel to the axis of the threaded opening. The base member and the cap member are connected so that they rotate together whereby the base member can be turned in the circumferential direction by means of the cap member. This common rotational feature is achieved by means of the flexural member. Accordingly, the flexural member in an expedient manner has matching surfaces cooperating with the anti-rotation surfaces of the base member and the cap member. Preferably, the matching surfaces on the flexural member are formed by pins and the anti-rotation surfaces by through openings. The diameter of the through openings are selected slightly smaller than the diameter of the pins, thus, the pins can be pressed into the through openings, so that the base member is connected with the cap member by the flexural member, whereby the base member and cap member are connected in an axially rigid manner forming a single unit whereby they can only rotate together.

Preferably, the attachment member is shaped as an attachment rail with an essentially rectangular C-shaped hollow section with a recess in the form of a slot-like opening. The width of the opening is limited by two legs disposed parallel to one another and projecting into the interior of the hollow section. The attachment device can be placed in the attachment member so that it can snap into place by means of the flexural member. In the preassembled position, the attachment device can be moved relative to the attachment member.

The base member must only be turned through 90° in the circumferential direction to fix the attachment device at a specific location on the fastening rail, so that the non-circular head can be pulled towards the attachment member and cooperates with it during tightening of the base member and of the cap member by means of the attachment member.

Such attachment devices are particularly suited for the installation of pipelines with the pipelines supported from the attachment device through appropriate pipe clamps and by means of support members in the form of threaded rods.

To fix the threaded rods to the attachment device, they are passed through the through opening in the central region of the cap member and then threaded into the threaded opening of the base member. The base member and the cap member can be pulled or clamped together by tightening a lock nut positioned on the threaded rod.

Preferably, the attachment member is a structural component with a non-circular recess into which the attachment device can be preassembled by snapping it in. The attachment member equipped in the attachment device can be secured to a fastening rail using only one hand on the attachment device. If the flexural member along with the attachment device is located at the correct point on the fastening rail, the cap member of the attachment device can be turned using one hand through 90° in the circumferential direction, whereby the base member grips beneath the legs of the fastening rail.

To assure safety against accidental turning of the flexural member with respect to the attachment device, the cap member is preferably provided with at least one projection serving as an anti-rotational security for the flexural member with the projection engaged in the recess of the flexural member.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
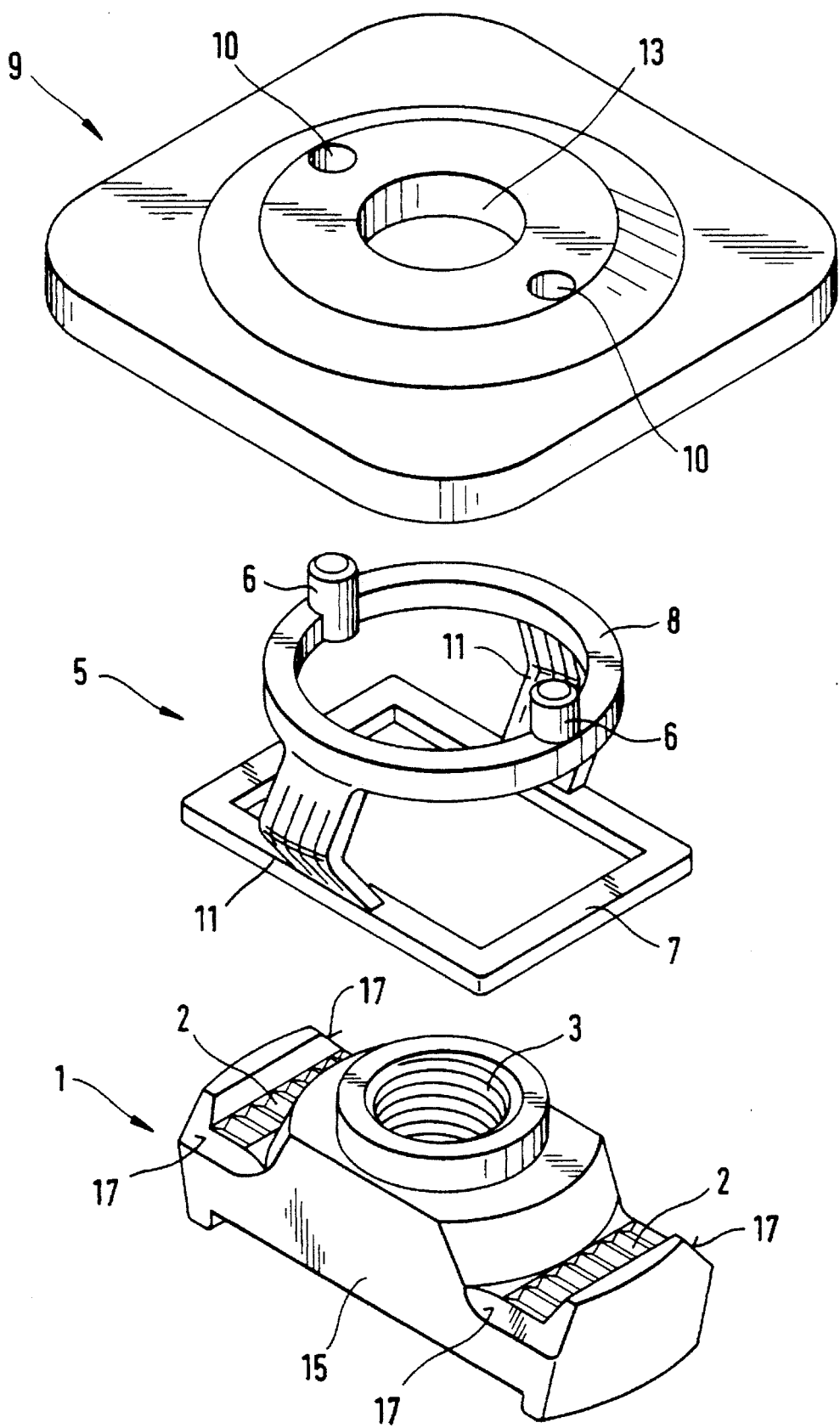
FIG. 1 is an exploded perspective view of an attachment device embodying the subject invention.
Figure 2:
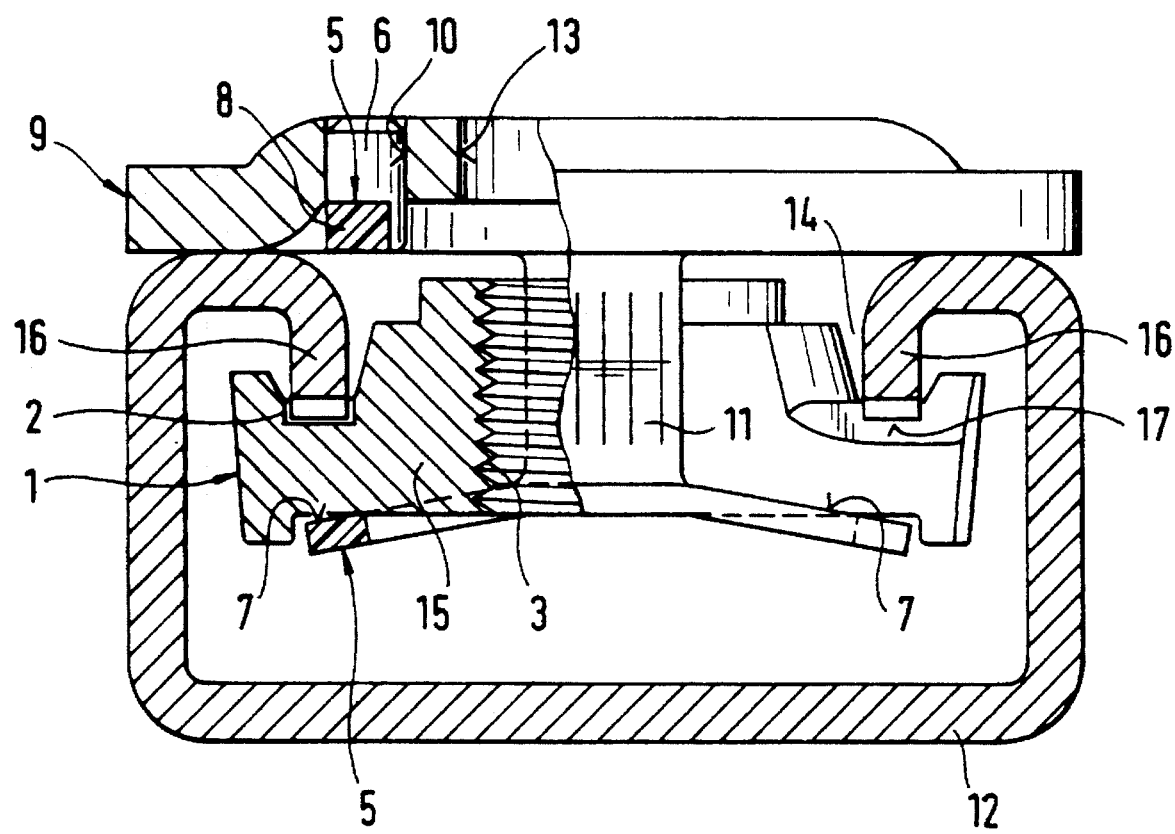
FIG. 2 is an elevational view, partly in section, of the attachment device in FIG. 1 connected to a attachment member.

FIGS. 1 and 2 display an attachment device including a base member 1, a cap member 9 and a flexural member 5, with the flexural member 5 positioned between the base member 1 and the cap member 9.

The base member 1 of the attachment device is formed of a hammer-like, non-circular head 15 with an axially extending threaded opening 3 extending through the head and two parallel toothed sections or strips 2 located on opposite sides of the threaded opening 3. Cap member 9 has a centrally located through opening 13 having a diameter larger than the external diameter of the threaded opening 3 in the base member 1. In addition, the cap member 9 has two anti-rotation surfaces 10 each in the form of the central through opening and located on diametrically opposite sides of the through opening 13. The flexural member 5 is capable of flexing in the radial direction as well as the axial direction with the axial direction corresponding to the axial direction of the threaded opening 3 and of the through opening 13. The flexural member 5 has matching surfaces 6 in the form of pins located diametrically opposite one another on a stop ring 8. The pin surfaces 6 engage in the through openings of the intermediate member 9. The diameter of the pins is slightly greater than the diameter of the through openings 10. The stop ring 8 bears against the cap member 9, note FIG. 2.

This attachment device can be used to secure pipelines at a attachment member 12 in the form of an essentially C-shaped fastening rail 12. The fastening rail is shaped so that it forms a hollow section having a rectangular cross-section, note FIG. 2. A recess 14 in the form of a slot-like opening extending in the long direction of the rail serves for receiving the attachment device. The width of the slot-like opening is defined by the facing surfaces of two legs 16 which are bent inwardly from the upper part of the fastening rail 12 as viewed in FIG. 2, so that they extend into the hollow section. The free or inner ends of the legs 16 face toward the side of the hollow section located opposite the slot-like opening. The inner free ends of the legs 16 have a toothed shape or profile. A matching toothed profile section 2 is located on the non-circular head 15 of the base member 1 on the side cooperating with the free ends of the legs 16.

An elastic or flexural matching surface 7 of the flexural member 5 affords axial flexural connection of the base member 1 to the cap member 9. Matching surface 7 is connected to the stop ring 8 by a connecting web 11 which can flex in the radial direction. The outside contour of the connecting webs 11 in the unloaded state is somewhat greater than the projection of the recess 14 or of the width between the legs 16 of the fastening rail. Upon insertion of the attachment device into the fastening rail, a snap-in securement of the attachment device by the elastic or flexural motion of the connecting webs 11 takes place.

In FIG. 2 it can be seen that the cap member 9 rests on the upper outer side of the fastening rail 12 with the toothed profile sections 2 of the base member 1 in engagement with the toothed profiles of the fastening rail. The elastic matching surface 7 of the flexural member 5 bearing against the base member 1 is in a prestressed condition.

If the attachment device is inserted into the slot-like opening formed by the recess 14 in the fastening rail 12 and turned through 90°, pilot tapers 17 on the base member 1 contact the legs 16 extending inwardly into the hollow section. The base member 1 and the cap member 9 are moved axially apart from one another by the pilot tapers 17. This feature provides prestress for the flexural member 5. If the position of the base member 1 is reached where the toothed profile section 2 on the base member 1 engage the toothed profile on the ends of the legs of the fastening rail, then an axial displacement of the base member takes place in the opposite direction towards the legs 16 by at least the amount of the height of the toothed profile section 2. In this position the flexural member 5 continues to be axially prestressed.

Figure 3:
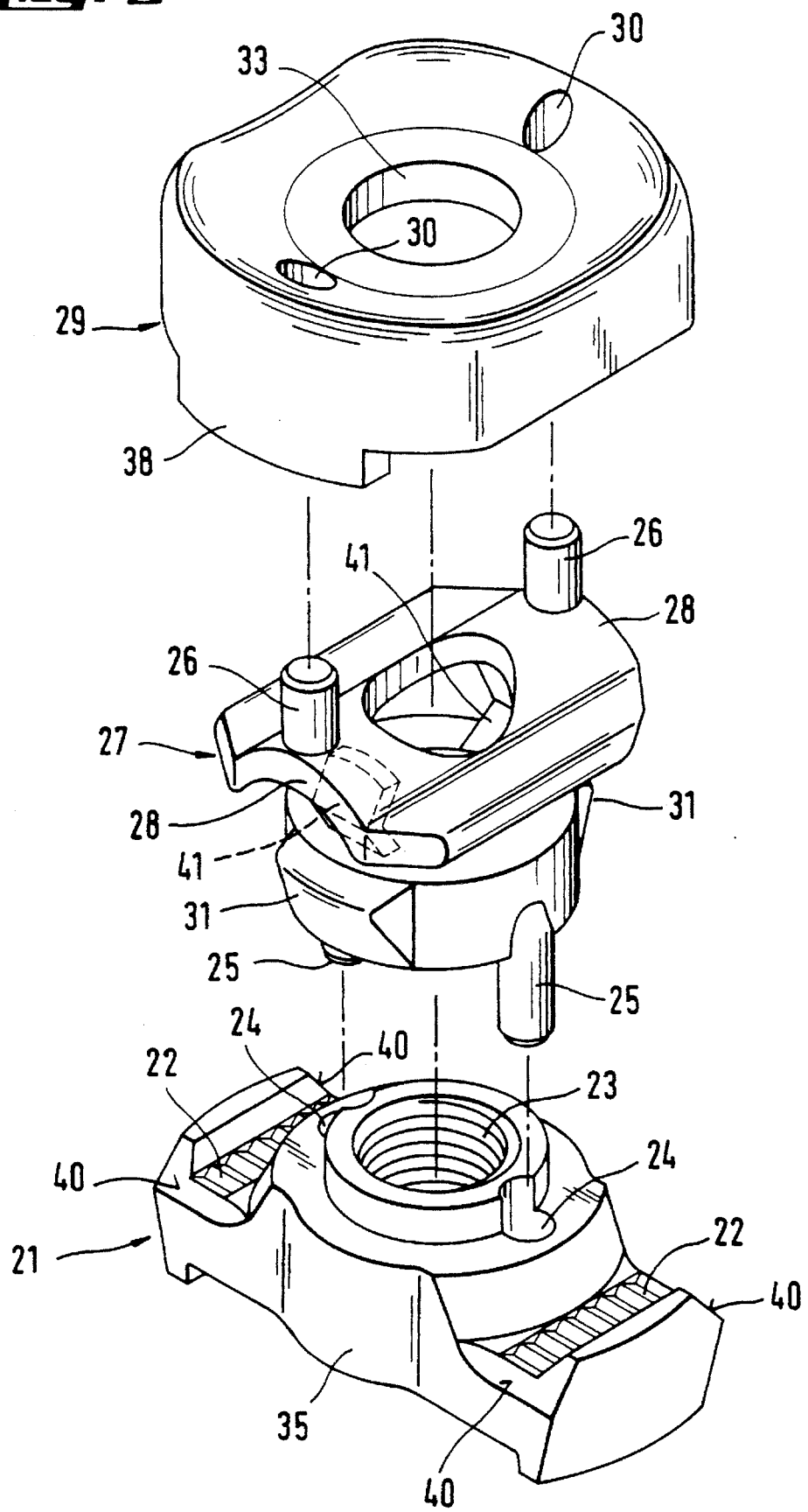
FIG. 3 is an exploded perspective view, similar to FIG. 1, of another attachment device embodying the present invention.
Figure 4:
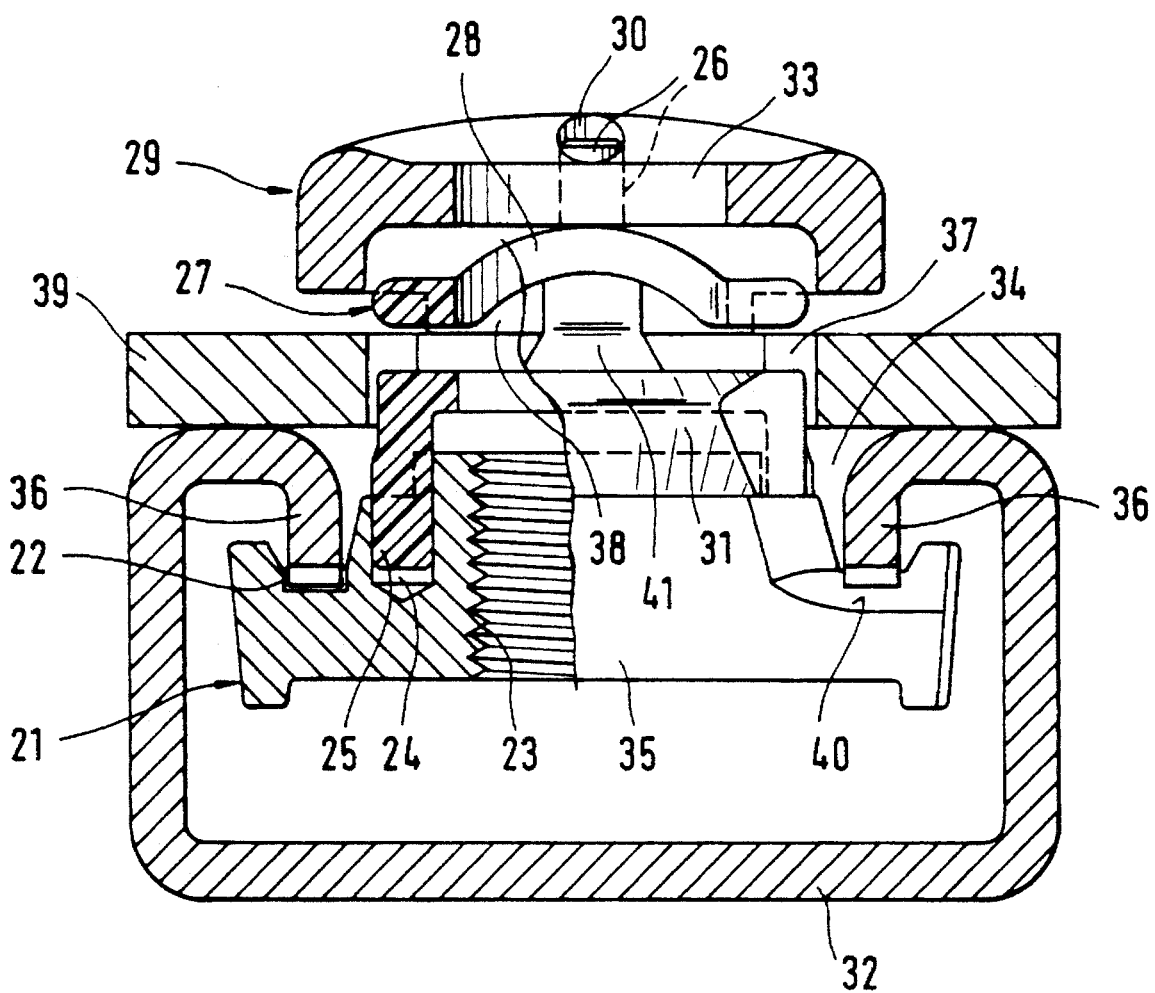
FIG. 4 is an elevational view, partly in section, of the attachment device in FIG. 3 engaged with an attachment member in the form of a structural component.

Another attachment device is shown in FIGS. 3 and 4 and is made up of a base member 21, a cap member 29 and a flexural member 27 with the flexural member located between the base member 21 and the cap member 29.

As shown in FIG. 4, the attachment device is used with a component member 39 in the form of a structural component and with a C-shaped fastening rail 32 forming a hollow section of rectangular cross-section. A slot-like opening 34 extending in the long direction of the rail serves for the insertion of the attachment device. The width of the slot-like openings 34 is limited by two spaced legs 36. As viewed in FIG. 4, the legs are bent inwardly from the upper side of the rail into the hollow section and are disposed parallel to one another. The free ends of the legs 36 face the side of the hollow section located opposite the slot-like opening.

The free ends of the legs 36 have a toothed profile. The toothed profile cooperates with a matching toothed profile section 22 on the base member 21 with the matching toothed profiles 22 located on opposite sides of the threaded opening 23 extending through the non-circular head 35.

The base member 21 has the thread 23 extending through the head 35 and two anti-rotation surfaces 24 in the form of through openings located on diametrically opposite sides of the threaded opening.

Cap member 29 has a centrally arranged through opening 33 which has a diameter greater than the outer diameter of the thread 23 in the base member 21. Two anti-rotation surfaces 30 disposed diametrically opposite one another and in the form of through openings are also located in the cap member 29. Two leg-shaped projections 38 are located diametrically opposite one another on the cap member spaced radially outwardly from the anti-rotation surfaces 30. As can be noted in FIG. 3 the leg-shaped projections 38 extend downwardly from the cap member 29 and afford an anti-rotational security for the component member 39 which can be fixed to the fastening rail 32 by the attachment device.

The flexural member 27 has a central through opening with a diameter greater than the outer thread diameter of the threaded opening 23 in the base member 21. In addition, flexural member 27 has four matching surfaces 25, 26 in the form of pins arranged in pairs diametrically opposite one another and offset relative to one another through 90° with each pair extending in an opposite direction, note FIG. 3. The diameter of these pins is slightly greater than the diameter of the through openings in the base member 21 and in the cap member 29. The pins cooperating with the cap member 29 are located in an axially elastic region 28 of the flexural member 27. The flexural member 27 has a radially flexural or deflectable section 21 located between the pairs of pins. The outer contour or outer diameter of the section 31 is larger than the width of the slot-like opening 34 in the fastening rail 32. The radially flexural or deflectable section 31 extends partially around the flexural member 27.

As shown in FIG. 4, the attachment device secures the component member 39 to the fastening rail 32. The component member 39 also has a recess or opening 37 to afford such connection whereby the non-circular head 35 of the base member 21 and a portion of the flexural member 27 can extend through the opening 37. The opening 37 serves to receive the leg-like projections 38 on the cap member 29 for affording anti-rotation security.

When securing an attachment device to the fastening rail 32, the attachment device is first pushed partially through the opening 37 in the component member 39 so that a snap-in like connection of the two members occurs. The component member 39 along with the attachment device can subsequently be placed in the fastening rail 32. Accordingly, the base member 21 is oriented with respect to the slot-like opening 34 so that the base member can be inserted into the slot-like opening.

The projections 38 extending on the intermediate member 29 in a leg-like manner rest on the surface of the component member 39. The radially flexural or deflectable section 32 of the flexural member 27 is located on the side of the component member 39 resting on the fastening rail 32. The cap member 29 and the base member 21 are connected together by the flexural member 27 so that they do not rotate relative to one another but rather rotate together. For securing the attachment device on the fastening rail 32 it is necessary to turn the base member 21 by means of the cap member 29 through 90°, so that pilot tapers 40 on the non-circular head 35 contact the legs 36 of the fastening rail 32.

An axial offset of the base member 21 with respect to the cap member 29 takes place by means of the pilot tapers 40, whereby the portion of the flexural element 27 elastic in the axial direction is prestressed. By turning the entire attachment device, the radially flexural or deflectable section 31 arrives in the largest dimension portion of the recess or opening 37 in the component member 39. As a result, the flexural member 27 can move freely in the region of the recess 37.

When tightening the attachment device along with the structural component 39 against the fastening rail, a fastening element, not shown, in the form of a bolt is passed through the central through opening 33 in the cap member 29 and through the flexural member 27 into the threaded opening 23 in the base member 21. When the bolt is tightened an axial drawing together of all the parts takes place, whereby the axially elastic region of the flexural member 27 is pressed together and the leg-like projections 38 of the cap member 29 engage in the recess or opening 37 of the component member 39. Accordingly, the connecting webs 41 located between the axially elastic region 28 and the radially flexural region 31 of the flexural member 27 are deformed in the axial direction.

While a specific embodiment of the invention has been shown and described in detail to illustrate the inventive principles, it will be understood that the invention may be embodied otherwise without departing from said principles.

I claim:

1. Attachment device comprising a base member (1, 21), a cap member (9, 19) and an attachment member (12, 32), said base member comprises a non-circular head (15, 35), a threaded opening (3, 23) extending axially through said head, and at least one first anti-rotation surface (24), said cap member (9, 29) comprises at least one axially extending through opening (13, 33) and at least one second antirotation surface (10, 30) fornon-rotational engagement with another surface, so that said first and second antirotational surfaces rotate as a unit, said cap member posirioned on said base marker wherein the improvement comprises that said attachment member (12, 39) has a non-circular opening (14, 37) for affording passage therethrough of said head (15, 35) of said base member (1, 21) in a specific angular position, a flexural member (5, 27) extending generally in the axial direction of said threaded opening (3, 23) and positioned adjoining at least one of said base member and cap member, said flexural member being spring deflectable transversely of the axis of said threaded opening (3, 23) in said base member (1, 21), and said flexural member has a radial outside surface in an unloaded condition projecting at least partly outwardly beyond an axial projection of said non-circular opening (14, 37) of said attachment (12, 39).

2. Attachment device, as set forth in claim 1, wherein said flexural member (5, 27) is located between said non-circular head (15, 35) of said base member (1, 21) and said cap member (9, 29).

3. Attachment device, as set forth in claim 1 or 2, wherein said flexural member (5, 27) can deflect parallel to the axis of said threaded opening (3, 23).

4. Attachment device, as set forth in claim 1, wherein said flexural member (5, 27) comprises first and second surfaces (6, 7, 25, 26) cooperating respectively with said first and second anti-rotational surfaces (10, 24, 30) of said base member (1, 21) and of said cap member 9, 29).

5. Attachment device, as set forth in claim 4, wherein said first end second surfaces (6, 25, 26) of said flexural member (5) are formed as pins and the anti-rotational surfaces (10,

24, 30) of said base member (1, 21) and of said cap member (9, 29) are formed as through openings arranged to receive said pins.

6. Attachment device, as set forth in claim 1 wherein said attachment member (12) is shaped as a fastening rail.

7. Attachment device, as set forth in claim 1, wherein said attachment member (39) includes a structural component located between said cap member and said base member and said structural component (39) having a non-circular opening extending therethrough.

8. Attachment device, as set forth in claim 7, wherein said cap member (29) comprises at least one projection (38) serving as an anti-rotational safety part for cooperation with said structural component (39), and said projection (38) can be connected with said non-circular opening (37) in said structural component (39).

\* \* \* \* \*